(No Model.) 2 Sheets—Sheet 1.

E. A. WRIGHT.
COTTON CHOPPER.

No. 479,693. Patented July 26, 1892.

Witnesses:
F. J. Elmore
W. H. Shipley

Inventor:
E. A. Wright
By P. T. Dodge
Atty.

(No Model.) 2 Sheets—Sheet 2.

E. A. WRIGHT.
COTTON CHOPPER.

No. 479,693. Patented July 26, 1892.

on line 3—3 on line 4—4

Witnesses:
F. J. Elmore
W. H. Shipley.

Inventor:
E. A. Wright
By P. T. Dodge
Atty.

UNITED STATES PATENT OFFICE.

EDGAR A. WRIGHT, OF MEMPHIS, TENNESSEE.

COTTON-CHOPPER.

SPECIFICATION forming part of Letters Patent No. 479,693, dated July 26, 1892.

Application filed December 17, 1891. Serial No. 415,380. (No model.)

*To all whom it may concern:*

Be it known that I, EDGAR A. WRIGHT, of Memphis, county of Shelby, and State of Tennessee, have invented a new and useful Improvement in Cotton-Choppers, of which the following is a specification.

My invention has reference to that class of cotton-choppers in which revolving knives are used to cut out the plants at suitable intervals in the row in order to leave gaps in the latter.

The principal aims of my invention are to improve the action of the chopping devices proper and to adapt them for attachment to ordinary straddle-row cultivators. To this end I arrange the rotary wheel or carrier to which the knives are attached to revolve in the direction in which the machine advances instead of revolving in a transverse direction, as usual, and I combine with the wheel means through which it may be connected to and carried by the ordinary shovel-carrying beams or drag-bars.

The connection of the chopper-wheel to the vertically and laterally swinging beams of a cultivator I believe to be original with myself, and I lay broad claim thereto, as the details of construction may be variously modified without departing from the limits of my invention.

The combination of the chopper with the beams is advantageous not only in that it permits an ordinary cultivator to be utilized as a cotton-chopper, but, also, in that it permits the chopper-blades to be shifted laterally in relation to the line of plants while in action, which I believe to be a wholly new feature in cotton-chopping machines.

I propose to use in connection with my chopping device rear sweeps or cultivating-shovels attached to the rear ends of the beams as substitutes for the ordinary shovels.

Figure 1:
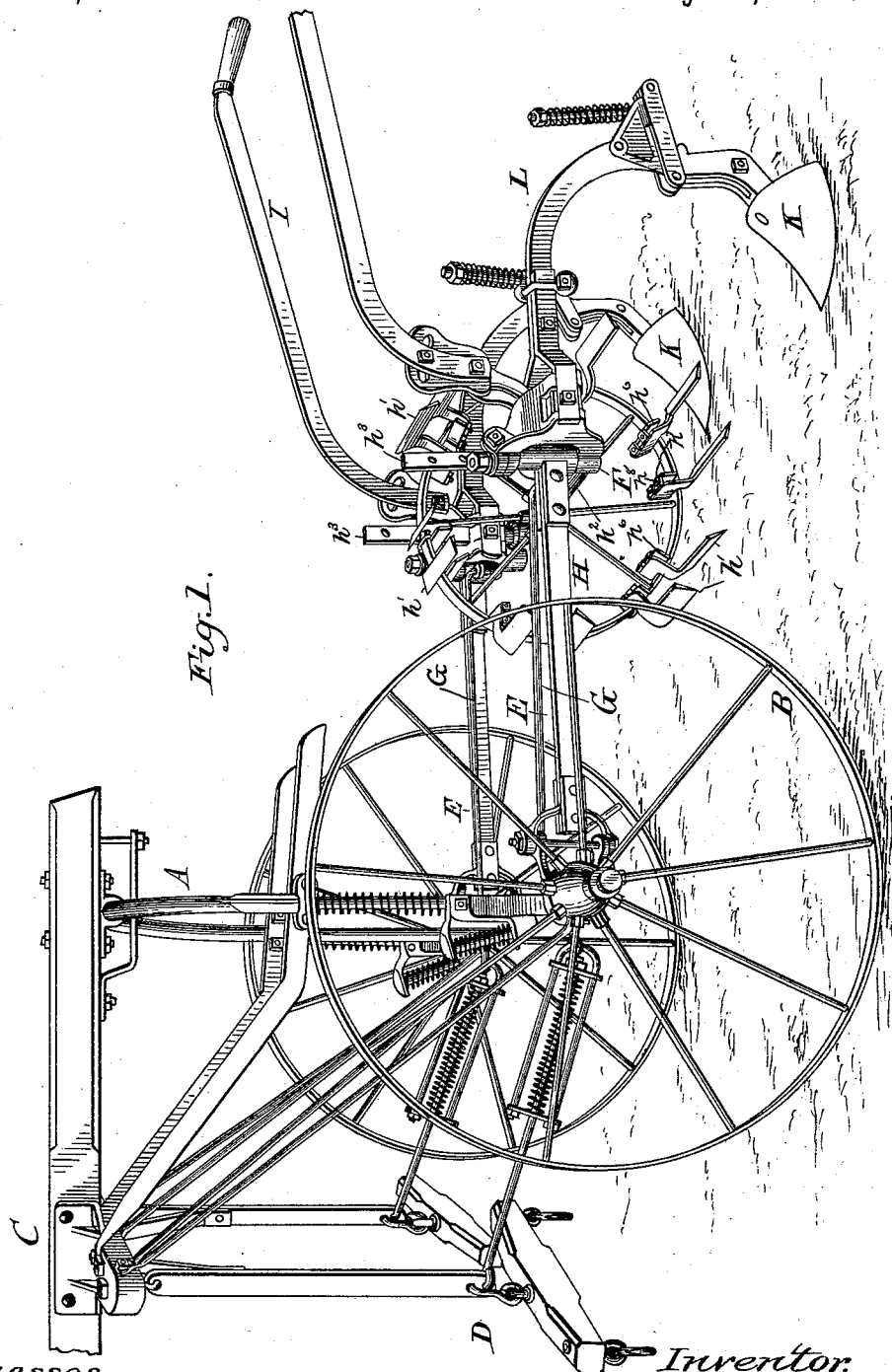
Figure 2:
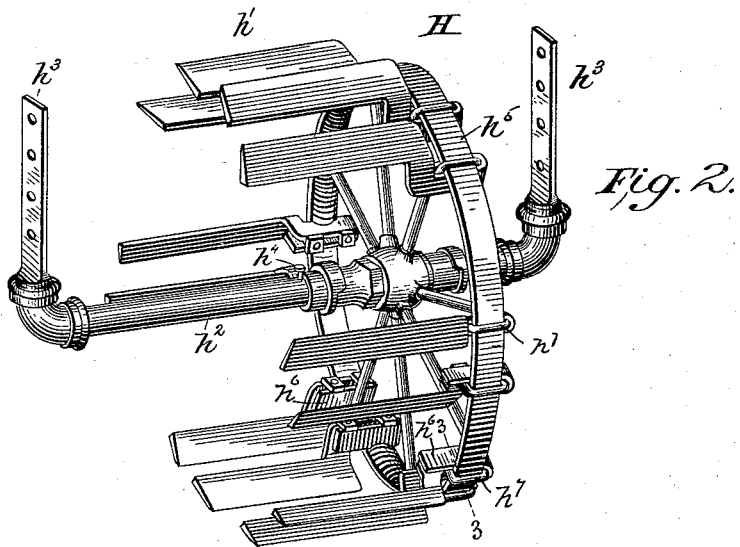
Figure 3:
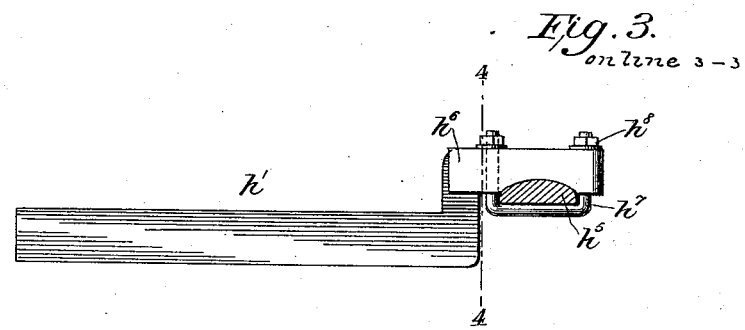
Figure 4:
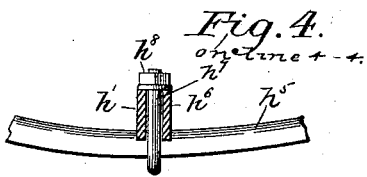

In the accompanying drawings, Figure 1 is a perspective view of a wheeled straddle-row cultivator such as is now in common use with the ordinary shovels removed and my chopping devices applied. Fig. 2 is a perspective view of the chopper-wheel and its supporting devices, the whole forming an attachment suitable for application to existing cultivators. Fig. 3 is a cross-section on the line 3 3 of Fig. 2. Fig. 4 is a cross-section on the line 4 4 of Fig. 3.

Referring to Fig. 1, A represents a rigid axle sustained at its ends in two ground-wheels B and provided at the middle with a forwardly-extending draft pole or tongue C.

D represents the draft devices, connected with the tongue and axle and serving to permit the connection of the draft-animals with the machine.

E E are two beams or drag-bars extending rearward from the respective ends of the axle and connected with the latter by couplings which permit the rear end of each beam to swing independently in vertical and horizontal directions.

F F are cross-heads or yokes applied transversely to the rear ends of the respective beams and connected therewith by vertical pivots, so that they may vibrate in a horizontal direction. Each of these heads is connected by a rod G, parallel with the beam, to the axle or the draft-coupling at the forward end, whereby the cross-head is caused to maintain a position parallel with the axle as it is moved laterally by the swinging motion of the beam. The cross-heads are intended to receive and carry standards having shovels at their lower ends, and in the ordinary use of the machine as a cultivator they are thus used in connection with standards and shovels.

The foregoing parts are all of ordinary construction and constitute jointly what is known in the art as a "wheeled straddle-row cultivator."

In proceeding to apply my improvement I remove from the ends of the yokes F the usual shovel-carrying standards, and I provide for connection thereto the chopping attachment H, (represented in Fig. 2,) consisting of a wheel provided at the periphery with laterally-projecting blades $h'$, and mounted at its center to turn loosely on a shaft or axle $h^2$, having rigid upturned ends $h^3$. This device, as a whole, is introduced between the cross-heads of the two beams and its upturned ends $h^3$ bolted rigidly to the inner ends of the respective cross-heads, as plainly shown in Fig. 1, so that as the machine advances the beams and cross-heads will sustain and carry the wheel. It will be observed that the wheel thus arranged will rotate in the direction in which the machine advances—that is to say, in a plane parallel with the length of the beams. The chopping-blades $h'$ extend laterally beyond the wheel and lie transversely of the row of plants upon which they act at suitable intervals. The beams are provided, as usual, at the rear ends with handles I, by means of which the operator walking behind the machine is enabled to swing the beams both horizontally and vertically, and in so doing to control the position of the chopping-wheel in like manner. The upturned ends of the shaft are provided each with a series of holes to receive the bolts for attaching them to the cross-heads, so that by changing the bolts from hole to hole the shaft and the cutter-wheel may be raised or lowered in relation to the beams and shovels. This arrangement of the chopping-wheel, so that it may be raised and lowered and moved laterally at the will of the operator while the machine is in motion, is of great practical advantage.

It will of course be understood that the details of the wheel, its knives, and the parts by which the wheel is connected with the cross heads or beams may be varied at will within the range of mechanical skill.

The shape of the supporting devices will of course be modified to adapt them to the peculiarities in form of different machines in the market, the essential feature of the invention residing in the suspension of the chopping-wheel between the two beams by supporting devices directly or indirectly thereto. Lateral motion of the chopping-wheel upon its axle may be prevented by pins $h^4$ or otherwise.

I recommend the construction of the wheels and knives and their connection in the peculiar manner shown in Figs. 2, 3, and 4, in which it will be seen that the wheel is a spoked one with a rim $h^5$ of semicircular form in cross-section. Each knife has an angular arm or shank $h^6$, returned or doubled upon itself in order to form a slot or opening to receive the two ends of the staple-bolt $h^7$, which is placed astride of the rim of the wheel and passed through the knife-arm and secured at the ends by nuts $h^8$. This arrangement permits the knives to be readily attached and detached and the distance between them to be changed at will, in order to cut the plants at longer or shorter intervals, as may be demanded.

In the drawings I have represented the shaft $h^2$ as constructed of ordinary tubing and connected at its ends by ordinary pipe-elbows to the flanged upright ends; but obviously any other construction of a similar character may be employed.

The chopper-wheel may be employed alone or without the employment of shovels. In some cases, however, I recommend the employment of sweep-shovels—that is to say, of broad pointed shovels arranged behind and on opposite sides of the chopper. I find it an excellent plan to attach the shovels, as shown at K K, to the lower ends of two standards L, which have their upper forward ends forked to embrace the respective cross-heads F, to which they are firmly bolted, so that as the beams swing laterally with the chopper they impart a like movement to the shovels, which are caused to face constantly in a forward direction.

Having thus described my invention, what I claim is—

1. In combination with a wheeled frame, two beams jointed to said frame to swing freely laterally, and a wheel sustained by and between said beams to revolve in the direction of travel and provided with transverse knives, substantially as described and shown.

2. In combination with a wheeled frame, two laterally-swinging beams jointed thereto and cross-heads connected to the beams by vertical pivots and adapted to receive a wheel-support, a knife-carrying wheel, and a support for the wheel, said support provided with means by which it may be attached to or detached from the cross-heads at will.

3. In combination with a wheeled frame, two laterally-swinging beams, cross-heads connected thereto by vertical axes, a knife-carrying wheel, a wheel-support attached to the cross-heads, shovel-carrying standards also attached to the cross-heads, and shovels applied to said standards, whereby the shovels are caused to face constantly in a forward direction as they swing laterally with the chopper-wheel.

4. In combination with a wheeled frame, a knife-carrying wheel arranged to rotate in the direction of travel, and suitable connections between the frame and the knife-carrying wheel, constructed to admit of the free bodily movement of the latter in a horizontal direction, whereby the said wheel may be moved laterally at will while the machine is in action.

5. The cotton-chopper attachment for a cultivator, consisting of a wheel with transverse knives and an axle having its ends adapted for connection at will with the cultivator-beams in such manner as to sustain the wheel so that it may rotate in the direction of travel.

6. In a cotton-chopper, a wheel having a rim, in combination with knives provided with slotted shanks and applied horizontally to said rim transversely thereof and the fastening-bolts extending through the slots and around the rim.

7. In a cotton-chopper, a wheel having a rim, in combination with a knife having an angular shank doubled upon itself to form a slot, and a fastening device extending through the slot and around the rim.

8. In combination with a wheeled frame and two beams provided at their rear ends with vertical sockets, a transverse axle having its ends upturned and extended through the sockets and adjustably connected thereto, and a knife-carrying wheel mounted to rotate on said axle.

In testimony whereof I hereunto set my hand, this 17th day of September, 1891, in the presence of two attesting witnesses.

EDGAR A. WRIGHT.

Witnesses:
O. B. STITELY,
H. A. WHITE.